RESISTIVELY TERMINATED SINGLE TEE AND PI ONE PORT NETWORK HAVING A PRESCRIBED POSITIVE REAL BI-ORDER-N IMMITTANCE AND UTILIZING A NEGATIVE IMMITTANCE

Filed Nov. 29, 1967 2 Sheets-Sheet 1

INVENTOR.
KURT H. HAASE
BY Harry A. Herbert Jr. and
Julian L. Siegel
ATTORNEYS

INVENTOR.
KURT H. HAASE
BY Harry A. Herbert Jr. and
Julian L. Siegel
ATTORNEYS

United States Patent Office 3,479,618

Patented Nov. 18, 1969

3,479,618

RESISTIVELY TERMINATED SINGLE TEE AND PI ONE PORT NETWORK HAVING A PRESCRIBED POSITIVE REAL BI-ORDER-N IMMITTANCE AND UTILIZING A NEGATIVE IMMITTANCE

Kurt H. Haase, Watertown, Mass., assignor to the United States of America as represented by the Secretary of the Air Force Filed Nov. 29, 1967, Ser. No. 686,587
Int. Cl. H03h *5/12*
U.S. Cl. 333—24 6 Claims

ABSTRACT OF THE DISCLOSURE

Circuits realizing decomposable bi-order-n impedance or admittance functions in which for the impedance function a single T section is terminated with a resistance and has a series positive and negative branch impedances and a shunt positive branch impedance interposed between said series branch impedances.

BACKGROUND OF THE INVENTION

This invention relates to a driving point impedance network, and more particularly to a one port network that is a canonical circuit representing a positive real bi-order-n immittance function.

A novel technique is presented to realize an immittance function presented by the analytical expression $$F(s)=\frac{s^n+N_{n-1}s^{n-1}+\cdots+N_1s+N_0}{s^n+D_{n-1}s^{n-1}+\cdots+D_1s+D_0} \quad (1)$$

The term "immittance" is of a neutral character and can be deliberately interpreted as "impedance" or "admittance." Since a canonical network is presented, the least amount of space and weight is required, which is advantageous in many applications.

SUMMARY OF THE INVENTION

A bi-order-n function is $$F(s)=\frac{s^n+N_{n-1}s^{n-1}+\cdots+N_1s+N_0}{s^n+D_{n-1}s^{n-1}+\cdots+D_1s+D_0} \quad (1)$$

where two polynomials of the same even order $n$ are divided. If F($s$) is positive real then in general none of the coefficients $N_i$ and $D_i$ in the sequence $0 \leqq i \leqq n-1$ is missing. The necessary and sufficient conditions for positive realness of F($s$) are well known and are referred to by Otto Brune in the "Journal of Mathematics and Physics," volume 10, pages 191–236, August 1931.

The present invention is mainly concerned with two circuits, one in terms of impedance and the other in terms of admittance. Both circuits have the same driving point immittance $\overline{F}(s)$ and are dual in the sense that the impedance circuit has the driving point impedance $$\overline{Z}(s)=\overline{F}(s)$$

and the admittance circuit has the driving point admittance $\overline{\Gamma}(s)=\overline{F}(s)$.

The function of $\overline{F}(s)$ is $$\overline{F}(s)=\frac{s^n+\overline{N}_{n-1}s^{n-1}+\cdots+\overline{N}_1s+\overline{N}_0}{s^n+\overline{D}_{n-1}s^{n-1}+\cdots+\overline{D}_1s+D_0} \quad (2)$$

The only difference between Equation 2 and Equation 1 is the use of bars over the capital letters. By this we indicate that $\overline{F}(s)$ is a particular bi-order-n function, further referred to as a "decomposable bi-order-n function." It can be obtained from any positive real bi-order-n function F($s$) according to $$\overline{F}(s)=F(s)-K[F_m(s)] \quad (3)$$

where F($s$) and $\overline{F}(s)$ are of the same rank $2n$ (both are bi-order-n functions), $F_m(s)$ is a "suitable" positive real function, and K is a positive constant that normalizes $\overline{F}(s)$.

It is therefore an object to provide a novel canonical driving-point network.

It is another object to provide a novel canonical driving-point network that represents a bi-order-n function.

It is still another object to provide a driving-point network representing a bi-order-n function in terms of impedances.

It is yet another object to provide a driving-point network that is a function of a bi-order-n function in terms of admittances.

BRIEF DESCRIPTION OF THE DRAWINGS

The above-mentioned and other advantages, features and objects of the invention will become more apparent from the following description taken in connection with the illustrative embodiments in the accompanying drawings, wherein.

DESCRIPTION OF THE PREFERRED EMBODIMENTS

Figure 1:
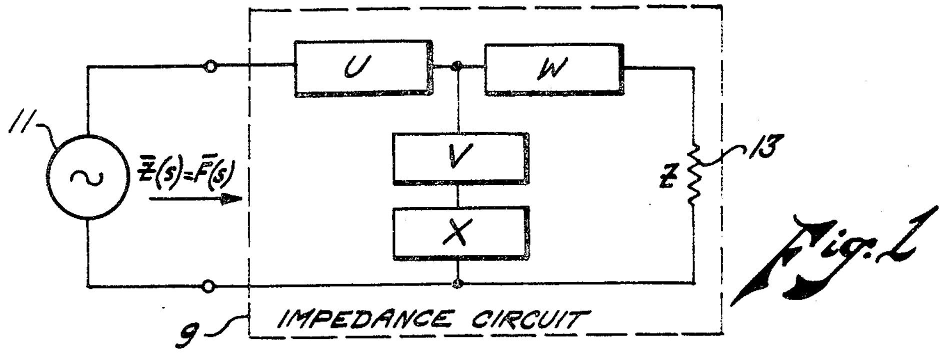
FIGURE 1 is a circuit diagram of the canonical network where the circuit components are represented as impedances.
Figure 2:
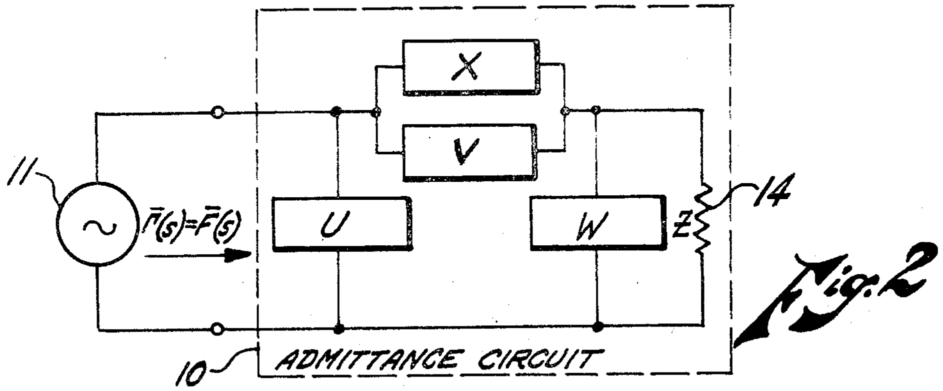
FIGURE 2 is a circuit diagram of the canonical network with the circuit components represented as admittances.

The circuits of FIGURE 1 and FIGURE 2 have the driving-point immittance $\overline{F}(s)$. Both circuits are dual in the sense that the circuit of FIGURE 1 has a driving-point impedance $\overline{Z}(s)=\overline{F}(s)$ and the circuit of FIGURE 2 has the driving-point admittance of $\overline{\Gamma}(s)=\overline{F}(s)$. Because of this duality, the invention is discussed in detail mainly with reference to the circuit of FIGURE 1 but everything holds true for the dual circuit of FIGURE 2.

Shown in FIGURE 1 is impedance network 9 having a single T section that is terminated with resistance 13 and of magnitude $$Z=z \quad (4)$$

where $z$ is the positive constant and the network is driven by source 11. The T has series branch impedances U and W, where U is a positive and W is a negative impedance. The T also has a shunt branch that is composed of positive impedances V and X and has the driving point impedance $\overline{Z}(s)=\overline{F}(s)$.

Shown in FIGURE 2 is admittance network 10 having a single pi section that is terminated with conductance 14 of the magnitude $Z=z$ where $z$ is again a positive constant and the network is driven by source 11. The pi has shunt branch admittances U and W, where U is a positive and W is a negative admittance and has a series branch that is composed of positive admittances V and X. The pi circuit has the driving-point admittance $\Gamma(s)=\bar{F}(s)$.

Let $$U=v(n-1)\varphi(s)=\mu\varphi(s) \quad (5a)$$
$$V=v\varphi(s) \quad (5b)$$
$$W=-v(n-1)\varphi(s)/n=w\varphi(s) \quad (5c)$$

where $v$ is positive, $n$ also positive and greater than 1, then $$1/u+1/v+1/w=0 \quad (6)$$

and $u=v(n-1)$ is positive and $w=-v(n-1)/n$ is negative. Hence W is negative. Let $\varphi(s)$ be a normalized and positive real function of the kind $$\phi(s)=s\frac{s^m+a_{m-1}s^{m-1}+\dots+a_1s+a_0}{s^m+b_{m-1}s^{m-1}+\dots+b_1s+b_0}=s\frac{a(s)}{b(s)} \quad (7)$$

In Equation 7 the order $m$ is any integer 1, 2, . . . $m$. Let $$X=x\Phi(s) \quad (8)$$

where $x$ is a positive constant and $\Phi(s)$ is a positive real and normalized function of the same rank as $\Phi(s)$, but of the form $$\Phi(s)=\frac{s^m+\beta_{m-1}s^{m-1}+\dots+\beta_1s+\beta_0}{s(s^m+\alpha_{m-1}s^{m-1}+\dots+\alpha_1s+\alpha_0)}=\frac{\beta(s)}{S\alpha(s)} \quad (9)$$

The driving-point immittances of the circuits in FIGURES 1 and 2 are $$\bar{F}(s)=\frac{(UV+UW+VW)+(U+W)X+(U+V)Z+XZ}{V+W+X+Z} \quad (10)$$

But by Equation 6

$$UV+UW+VW=0 \quad (11)$$

Substituting the results in Equations 4 and 9 we obtain therefore $$\bar{F}(s)=\frac{s^2a(s)\alpha(s)+x(n-1)^2sa(s)\beta(s)+xb(s)\beta(s)/vn}{s^2a(s)\alpha(s)+sb(s)\alpha(s)/vn+xnb(s)\beta(s)/v} \quad (12)$$

The highest power of $s=\sigma+j\omega$ in the numerator and the denominator of (12) is $2m+2$ since $a(s)$ and $\alpha(s)$ are both polynomials of the order $m$. Therefore, with $$n=2m+2 \quad (13)$$

the function $\bar{F}(s)$ can also be written in the general form $$\bar{F}(s)=\frac{\bar{N}(s)}{\bar{D}(s)}=\frac{s^n+\bar{N}_{n-1}s^{n-1}+\dots+\bar{N}_1s+\bar{N}_0}{s^n+\bar{D}_{n-1}s^{n-1}+\dots+\bar{D}_1s+\bar{D}_0} \quad (14)$$

Since the functions $\bar{F}(s)$ in Equations 14 and 12 are identical, the coefficients associated with the same powers of the variable $s$ in both equations can be compared. Two systems of equations are thus obtained.

Let $m=1$, so that $$\phi(s)=s\frac{s+a}{s+b},\ a>b \quad (15)$$

$$\Phi(s)=\frac{s(s+\beta)}{s+\beta},\ \alpha>\beta \quad (16)$$

The system derived from the comparison of the numerators is $$\bar{N}_3=(a+\alpha)+\bar{N}_1' \quad (17a)$$
$$\bar{N}_2=a\alpha+(a+\beta)\bar{N}_0'+\bar{N}_0' \quad (17b)$$
$$\bar{N}_1=a\beta\bar{N}_1'+\bar{N}_0'(b+\beta) \quad (17c)$$
$$N_0=b\beta\bar{N}_0' \quad (17d)$$

The system derived from the comparison of the denominators is $$\bar{D}_3=(a+\alpha)+\bar{D}_1' \quad (18a)$$
$$\bar{D}_2=a\alpha+(b+\alpha)\bar{D}_0'+\bar{D}_0 \quad (18b)$$
$$\bar{D}_1=b\alpha\bar{D}_1'+\bar{D}_0'(b+\beta) \quad (18c)$$
$$\bar{D}=b\beta\bar{D}_0' \quad (18d)$$

In Equations 17*a*–*d* and 18*a*–*d* we defined $$\bar{N}_1'=x(n-1)^2 \quad (19a)$$
$$\bar{N}_0'=x/vn \quad (19b)$$
$$\bar{D}_1'=1/vn \quad (20a)$$
$$\bar{D}_0'=xn/v \quad (20b)$$

In order for $\varphi(s)$ and $\Phi(s)$ to be positive real it is necessary that both $a$ and $\alpha$ be positive and also $a>b$ and $a>\beta$. $\bar{N}_1'$, $\bar{N}_0'$, $\bar{D}_1'$, and $\bar{D}_0'$ must also be positive. Hence, Equations 17*a*–*d* and 18*a*–*d* determine the coefficients of a "decomposable function F($s$)" where $m=1$. When the aforementioned constants and coefficients are known, then the entire circuit of FIGURE 1 or FIGURE 2 is known.

Figures 3A, 3B, 4A, 4B:
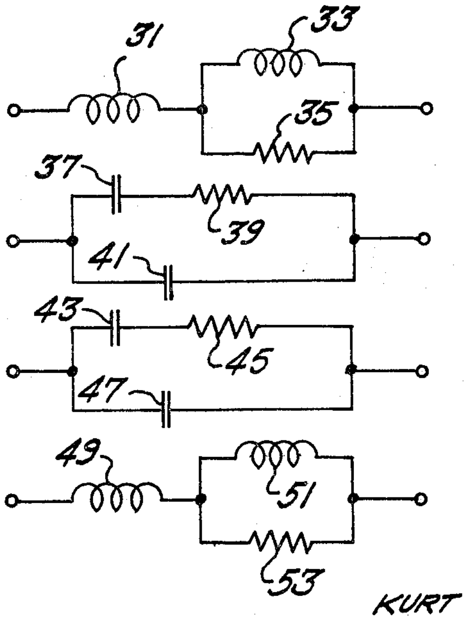
FIGURES 3*a* and 3*b* show the circuit elements that can be used when the circuit is represented in terms of impedances.
FIGURES 4*a* and 4*b* show the circuit elements that can be used when the circuit is represented in terms of admittances.

When $m=1$, the following circuit elements are applicable. The impedance circuit implying the function $\varphi(s)$ which equals $$s\frac{s+a}{s+b}$$

is shown in FIGURE 3*a*. This circuit comprises inductor 31 in series with the parallel combination of inductor 33 and resistor 35. The impedance circuit implying $$\Phi(s)=\frac{1}{s}\cdot\frac{s+\beta}{s+\alpha}$$

which is shown in FIGURE 3*b*. The circuit comprises capacitor 41 in parallel with the series combination of capacitor 37 and resistor 39. The admittance circuit implying the function $$\phi(s)=\frac{s+a}{s+b}$$

is shown in FIGURE 4*a*, in which capacitor 47 is in parallel with the series combination of capacitor 43 and resistor 45. The admittance function implying $$\Phi(s)=\frac{1}{s}\cdot\frac{s+b}{s+\alpha}$$

is shown in FIGURE 4*b*, which comprises inductor 49 in series with the parallel combination of inductor 51 and resistor 53.

Immittance W is negative and must be realized with a negative impedance converter or a negative admittance converter, respectively. Such converters are well known elements in network circuitry.

The termination in both circuits of FIGURE 1 and FIGURE 2 is given by $$zn^2=1 \quad (21)$$

A positive real bi-order-n function F($s$) may not be decomposable, that is, with un-barred coefficient notations. Then Equations 17*a*–*d* and 18*a*–*d* cannot be used. However, a decomposable function $\bar{F}(s)$ can be obtained by Equation 3 and the circuits realizing F($s$) would have the configurations shown in FIGURES 5 and 6.

Figure 5:
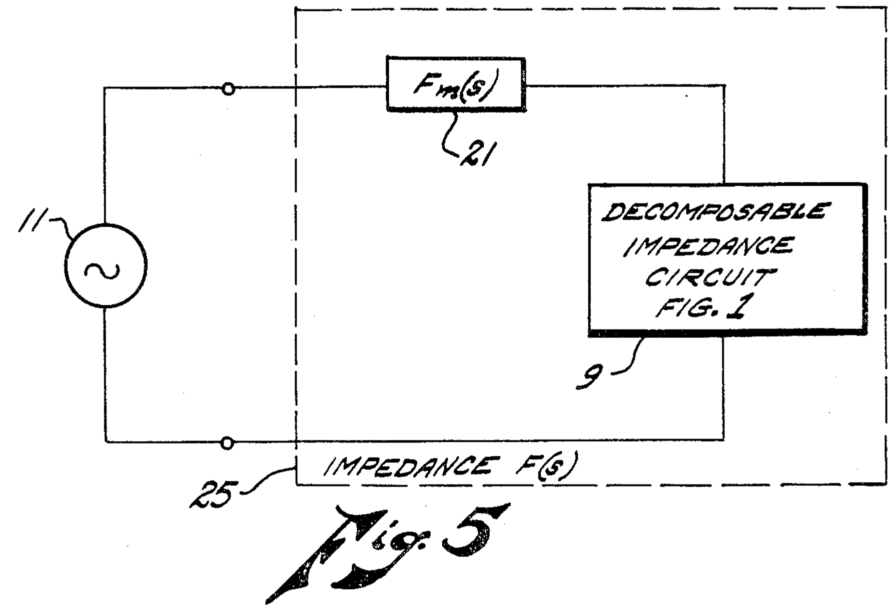
FIGURE 5 is a circuit diagram showing the method of converting a positive real bi-order-n function represented in terms of impedances that is not decomposable into a circuit that is decomposable.

FIGURE 5 shows decomposable impedance circuit 9 connected in series to function $F_m(s)$ 21 with the entire impedance function F($s$) 25 driven by source 11.

Figure 6:
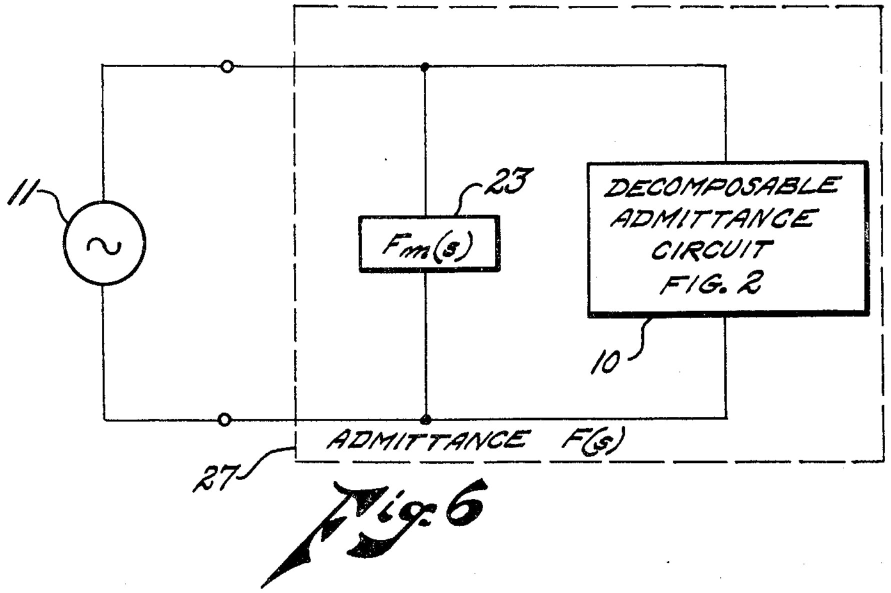
FIGURE 6 is a circuit diagram showing the method of converting a positive real bi-order-n function represented in terms of admittance that is not decomposable into a circuit that is decomposable.

In FIGURE 6 there is shown decomposable admittance circuit 10 connected in parallel to circuit $F_m(s)$ 23 with admittance function F($s$) 27 driven by source 11.

Circuits 21 and 23 are resistances or resistances in combination with inductances and capacitances in series or parallel configuration, such as that shown in FIGURES 3 and 4.

I claim:

1. A one port impedance network representing the bi-order-n function $$F(s)=\frac{s^n+N_{n-1}s^{n-1}+\cdots+N_1s+N_0}{s^n+D_{n-1}s^{n-1}+\cdots+D_1s+D_0}$$

the network comprising:

(a) a driving source;

(b) a first positive impedance connected to the driving source and equal to $u\varphi(s)$;

(c) a negative impedance equal to $w\varphi(s)$ connected to the first positive impedance and in series therewith;

(d) a second positive impedance equal to $v\varphi(s)$ connected to the junction of the first positive impedance and the negative impedance;

(e) a third positive impedance equal to $x\Phi(s)$ having a series connection to the second positive impedance and the driving source;

(f) and a resistance equal to $z$ terminating the network and in series with the negative resistance and in parallel with the second and third positive impedances, the valves of $u$, $v$, $w$, $x$, and $z$, being positive constants with $$\frac{1}{u}+\frac{1}{v}+\frac{1}{w}=0$$

2. A one port impedance network according to claim 1 wherein $\varphi(s)$ comprises:

(a) a first inductor;

(b) and a parallel combination including a second inductor and a resistor in series connection with the first inductor.

3. A one port impedance network according to claim 1 wherein $\Phi(s)$ comprises:

(a) a first capacitor;

(b) and a series combination including a second capacitor and a resistor in parallel connection with the first capacitor.

4. A one port admittance network representing the bi-order-n function $$F(s)=\frac{s^n+N_{n-1}s^{n-1}+\cdots+N_1s+N_0}{s^n+D_{n-1}s^{n-1}+\cdots+D_1s+D_0}$$

the network comprising:

(a) a driving source;

(b) a first positive admittance equal to $u\varphi(s)$ in parallel connection with the driving source;

(c) a second and third positive admittance forming a parallel combination and equal to $x\varphi(s)$ and $v\varphi(s)$ with the parallel combination connected to the first positive admittance;

(d) a negative admittance equal to $w\varphi(s)$ and in series connection with the parallel combination and the driving source;

(e) and a conductance equal to $z$ terminating the network and in parallel connections with the negative admittance, the values of $u$, $v$, $w$, $x$, and $z$ being positive constants with $$\frac{1}{u}+\frac{1}{s}+\frac{1}{w}=0$$

5. A one port admittance network according to claim 4 wherein $\varphi(s)$ comprises:

(a) a first capacitor;

(b) and a series combination including a second capacitor and a resistor in parallel connection with the first capacitor.

6. A one port admittance network according to claim 4 wherein $\Phi(s)$ comprises:

(a) a first inductor;

(b) and a parallel combination including a second inductor and a resistor in series connection with the first inductor.

References Cited

UNITED STATES PATENTS 3,219,952 11/1965 Saraga ______________ 333—80

HERMAN KARL SAALBACH, Primary Examiner

PAUL L. GENSLER, Assistant Examiner

U.S. Cl. X.R.

333—70, 80